Nov. 4, 1958 — P. A. D. HOBBS ET AL — 2,859,075
SHEAVE ASSEMBLY SEAL
Filed April 29, 1955

INVENTOR.
PHILLIP A. D. HOBBS
JOSEPH B. KOENEKE
BY
Buckhorn and Cheatham
ATTORNEYS

United States Patent Office 2,859,075
Patented Nov. 4, 1958

2,859,075

SHEAVE ASSEMBLY SEAL

Phillip A. D. Hobbs and Joseph B. Koeneke, Portland, Oreg., assignors to The Skookum Company, Inc., Portland, Oreg., a corporation of Oregon Application April 29, 1955, Serial No. 504,712

5 Claims. (Cl. 308—187.1)

This invention relates to a sheave assembly seal, and more particularly to a sealing structure for keeping lubricant within a bearing enclosure for a sheave and for keeping such foreign materials as sand, dirt, water, etc. out of the bearing enclosure when the sheave is employed as part of a block for logging or construction operations, or similar heavy-duty uses under adverse conditions.

In many heavy-duty uses, and particularly in logging operations, for example, yarding or skidding, blocks for wire rope are employed under extremely adverse conditions. Such blocks are frequently operated under conditions in which they rest upon the ground and are dragged thereacross so as to be covered with sand or earth, or even water and mud. It is extremely important that abrasive materials as well as water be kept out of the bearing enclosure of the sheave, as otherwise the bearing will be rapidly destroyed. Various types of sealing structures have been suggested and employed in sheave assemblies used in blocks under such adverse conditions as above discussed, but such sealing structures have either not been of sufficiently rugged construction to stand up in actual use or have failed even initially to adequately protect the bearing structure.

In accordance with the present invention, a simple sealing structure is provided in which lubricant tending to leave the bearing enclosure, or foreign materials tending to enter the bearing enclosure, are prevented from so doing by a series of sealing devices in a sealing structure having high mechanical strength and which is largely protected against external impact by the side members of the block.

The object of the present invention is, therefore, to provide an improved sealing arrangement for the bearings of sheave assemblies in blocks intended for heavy-duty use under adverse conditions.

Another object of the invention is to provide a sealing structure for the bearings of sheave assemblies in which the entrance of deleterious foreign materials into the bearing enclosure for the sheave is effectively prevented and the sealing structure is of rugged construction.

A further object of the invention is to provide a sealing structure for a sheave assembly in which sealing engagement is effected between a plurality of angularly disposed surfaces on sleeve members carried by the sheave so as effectively to prevent the entrance of foreign material into a bearing structure.

Other objects and advantages of the invention will appear in the following description of a preferred embodiment thereof given in connection with the attached drawing of which:

Figures 1, 2:
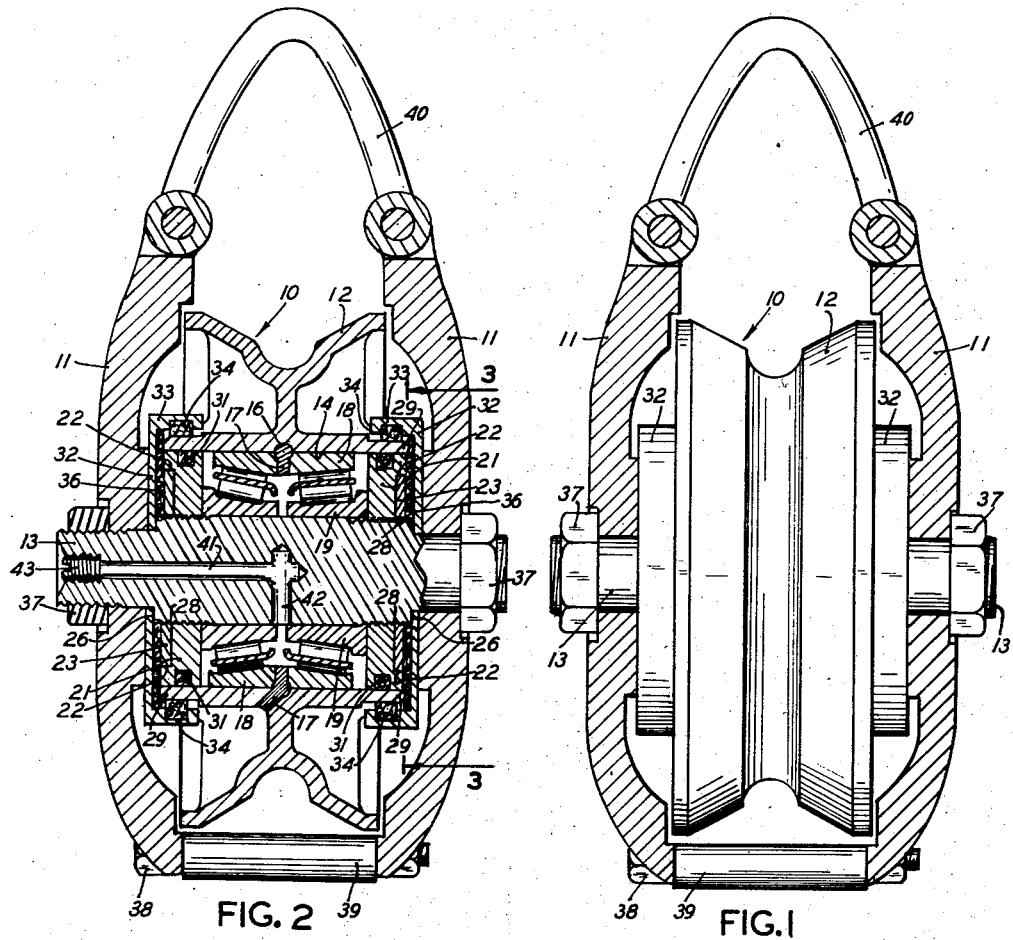
Fig. 1 is a view showing a block with the block sides in vertical section and the sheave assembly in elevation.
Fig. 2 is a fragmentary vertical section showing the sheave assembly and a portion of the block sides.

Referring more particularly to the drawing, the sheave assembly 10 of the present invention is mounted in block side plates 11 and includes a sheave 12 rotatably journaled on a pin 13 having its ends extending through bores in the side plates 11. The sheave 10 has a central bore 14 therein of larger diameter than the pin 13, the bore extending entirely through the hub portion of the sheave and being provided at its mid portion with an internal annular groove which is filled with Babbitt metal to provide a ring 16 of such metal as a bearing spacer. One or more openings 17 extending from the annular groove through the hub portion of the sheave and to the exterior surface thereof are provided to assist in introducing the Babbitt metal in molten form, such openings being effectively closed by the solidified Babbitt metal. The ring 16 of Babbitt metal functions as a retaining and centering element for a pair of outer race members 18 of antifriction bearings shown, by way of example, as being of the tapered roller type. The outer race members 18 have an external diameter fitting the bore 14 in the sheave. A separate outer race member 18 for each bearing is shown, but it will be understood that a single, one-piece outer race member for both bearings may be employed, in which case it may be provided with a suitable groove or suitable openings in its periphery to receive Babbitt metal. In either case, molten Babbitt metal is introduced and allowed to solidify after the outer race members have been properly positioned and held against displacement. The inner bearing race members 19 are supported upon and fit the central portion of the pin 13. The central portion of the pin 13 is screw-threaded at its ends and annular bearing retainer members 21 are screw-threaded thereon so as to engage the inner races 19 and hold such races in adjusted position upon the pin 13. By rotating one or the other of the bearing retainer members 21, or both, relative to the pin 13, the antifriction bearings can be adjusted or shifted longitudinally of the pin 13 to center the sheave 12 with respect to the pin.

Figure 3:
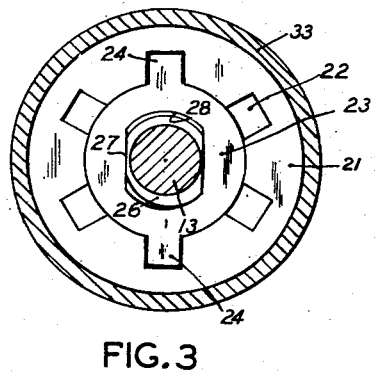
Fig. 3 is a fragmentary vertical section taken on the line 3—3 of Fig. 2.

In order to lock the bearing retainer members 21 in adjusted position, these members have on their outer faces a central recess with a plurality of radially extending portions 22 terminating a substantial distance from the periphery of the retainer member 21 and providing radially inwardly extending lugs between the radially extending recesses. A locking member 23 is positioned in the central recess of each bearing retainer member and is provided with a pair of radially extending lugs 24 positioned in the diametrically opposed recess portions 22 on the bearing retainer member. The pin 13 is provided with a shoulder 26 at each end, and the central portion of the pin 13 immediately adjacent each of the shoulders 26 is provided with a flattened portion 27 on both sides thereof (Fig. 3). Each locking member 23 has a central aperture 28 therein with sides fitting the flattened ends of the central portion of the pin so that the locking member is held against rotation to hold its associated bearing retainer member 21 against rotation.

The bearing retainer members 21 also function as sealing members. The sheave 12 has axially extending sleeve portions 29 which extend beyond the bearings and concentrically surround the peripheries of the bearing retainer members 21. The bearing retainer members and the sleeve portions 29 provide pairs of opposed portions between which are positioned sealing elements 31 in sealing relationship therewith, the sealing elements 31 being carried in grooves which are preferably positioned in the peripheries of the bearing retainer members 21. Further sealing structure is provided by cap members 32 having bores fitting the end portions of the pin 13, the central portions of the cap members engaging against the shoulders 26. The cap members 32 have axially extending annular portions 33 surrounding and concentric with outer end portions of the sleeve portions 29 to provide another pair of opposed portions at each side of the bearing enclosure. Another sealing element 34, preferably positioned in an annular groove in the inner surface of the inwardly extending portions 33 of each of the cap members, extends between such opposed portions to provide another seal at each side of the sealing structure. The outer peripheries of the web portions of the cap members 32 are also positioned adjacent and opposed to the ends of the sleeve portions 29 to provide further pairs of opposed portions. Another sealing element in the form of a washer 36 is positioned within each cap member 32 and has its outer portions between the end of a sleeve member 29 and the web of a cap member 32. The sealing elements 36 extend between the locking members 23 and the web portions of the cap members 32 as well as between the lugs 22 of the bearing retainer members 21 and the web portions of the cap members. The cap members, acting through the sealing members 36, thus hold the locking members 23 in position upon the pin 13 and against the bearing retainer members 21.

The cap members 32 forming part of the sealing structure are held in position upon the pin 13 by the side members 11 of the block. Nuts 37 screw-threaded upon the reduced ends of the pin 13 hold the block sides 11 securely against the cap members 32 so that the cap members 32 are held tightly against the shoulders 26 on the pin 13 in sealing engagement therewith. The shoulders 26 on the pin 13 are correctly spaced so that the outer portions of the webs of the cap members are adjacent and spaced from the ends of the sleeve portions 29 of the sheave to provide space for the sealing elements 36. The side members 11 of the block may also be secured together at their lower ends by bolts 38 extending through spacer members 39 (Fig. 1). Also, the upper ends of the sides 11 may be connected together by means of a shackle 40. Lubricant may be introduced into the bearing structures through intersecting bores 41 and 42 providing a passage from one end of the pin 13 into the space between the bearing retainer members 21. As shown in Fig. 2, the bore 41 preferably terminates between the inner races of the two tapered roller bearings, and the outer end of the bore 42 is preferably closed with a screw 43 which screws into the end of the bore.

It will be apparent that the structure just described may be assembled by inserting the outer race member or members 18 of the bearings into the bore 14 and holding them in proper position while introducing molten Babbitt metal to provide the ring 16. The bearings, including the inner race members 19, may then be placed in position. The pin 13 may then be inserted into the race members 19 of the bearings, and the bearing retainer members 21 in which the sealing elements 31 have been inserted, then threaded upon the pin. When the bearing retainer members 21 are in proper adjusted position, the locking members 23 may be applied so that the lugs 24 thereon fit in the radially extending recesses 22 on the bearing retainer members 21. The cap members 32 in which the sealing elements 34 and 36 have been positioned may then be placed in position, followed by the side members 11 of the block.

It will also be apparent from the above description of the structure of the present invention that three separate seals between the relatively rotating parts surrounding the bearing enclosure are provided at each end thereof. Inner seals are provided between the outer peripheries of the bearing retainer members 21 and the inner cylindrical surfaces of the sleeve portions 29. Intermediate seals are provided between the ends of the sleeve portions 29 and the outer peripheries of the webs of the cap members 32. Outer seals are provided between the axially extending portions 33 of the cap members 32 and the outer cylindrical portions of the sleeve portions 29. In order for foreign material to reach the interior of the sheave and progress into the bearing structure, such foreign material must first move axially outwardly of the sheave through the outer seals provided by the sealing element 34, then move radially inwardly of the sheave through the intermediate seals provided by the sealing elements 36, and then move axially inwardly of the sheave through the inner seals provided by the sealing members 31. The material from which the various sealing elements are made is preferably a good grade of sealing felt, but any other known or suitable sealing material, for example, leather, or certain types of rubberous material, etc., may be employed, depending upon the use to which the block is subjected. In actual employment of the sealing structure shown, it has been found that the entrance of foreign material into the interior of the sheave is effectively prevented even though the block is used under extremely adverse conditions for long periods of time.

We claim as our invention:

1. In a sheave assembly, a central pin, a sheave surrounding and rotatably mounted upon said pin, said sheave having axially extending sleeve portions on each side thereof concentric with and radially spaced from both said pin and the outer peripheral surface of said sheave, an annular member secured against rotation on said pin at each side of said sheave, each annular member having a peripheral portion adjacent the inside of one of said sleeve portions to provide a pair of opposed portions, a cap member secured against rotation on said pin on each side of said sheave, each cap member having a portion adjacent the end portion of one of said sleeve portions to provide another pair of opposed portions and a portion surrounding and adjacent the outer portion of the last-mentioned one of said sleeve portions to provide a further pair of opposed portions, and a sealing member positioned between each of said pairs of opposed surfaces.

2. In a sheave assembly, a central pin, a bearing assembly mounted on said pin, a sheave surrounding and rotatably mounted on said bearing assembly, said sheave having an axially extending sleeve portion on each side thereof surrounding and radially spaced from said pin and also concentric with and spaced radially inwardly from the outer peripheral surface of said sheave, an annular member secured against rotation on said pin on each side of said bearing assembly, each annular member having a peripheral portion adjacent the inside of one of said sleeve portions to provide a pair of opposed portions, a cap member secured against rotation on said pin on each side of said bearing assembly, each cap member having a portion adjacent the end portion of one of said sleeve portions to provide another pair of opposed portions and a portion surrounding and adjacent the outer portion of the last-mentioned one of said sleeve portions to provide a further pair of opposed portions, and a sealing member positioned between each of said pairs of opposed portions.

3. In a sheave assembly, a central pin, a bearing assembly mounted on the central portion of said pin, a sheave surrounding and rotatably mounted on said bearing assembly, said sheave having an axially extending sleeve portion on each side thereof concentric with and radially spaced from both such pin and the outer peripheral surface of said sheave, an annular member secured against rotation on said pin on each side of said bearing assembly, each annular member having a peripheral portion adjacent the inside of one of said sleeve portions to provide a pair of opposed portions, a cap member mounted on said pin outside of and adjacent each of said annular members, each cap member having a portion adjacent the end portion of one of said sleeve portions to provide another pair of opposed portions and a portion surrounding and adjacent the outer portion of the last-mentioned one of said sleeve portions to provide a further pair of opposed portions, a sealing member between each of said pairs of opposed portions, and means to support said pin and hold said cap member in sealing engagement with said pin and against rotation on said pin.

4. In a sheave assembly, a central pin, a bearing assembly mounted on the central portion of said pin, a sheave surrounding and rotatably mounted on said bearing assembly, said sheave having an axially extending sleeve portion on each side thereof concentric with and radially spaced from both such pin and the outer peripheral surface of said sheave, an annular member on said pin on each side of said bearing assembly, each annular member having a peripheral portion adjacent the inside of one of said sleeve portions to provide a pair of opposed portions, a cap member mounted on said pin outside of and adjacent each of said annular members, each cap member having a portion adjacent the end portion of one of said sleeve portions to provide another pair of opposed portions and a portion surrounding and adjacent the outer portion of the last-mentioned one of said sleeve portions to provide a further pair of opposed portions, a sealing member between each of said pairs of opposed portions, means to support said pin and hold said cap member in sealing engagement with said pin and against rotation on said pin, said bearing assembly including a pair of antifriction bearing elements, said annular members being bearing retainer members screw-threaded on said pin and engaging said bearing elements, and a locking member engaging each annular member and mounted on said pin for preventing rotation of the annular members relative to said pin, said cap members holding said locking members in locking position.

5. In a sheave assembly, a central pin, a bearing assembly mounted on the central portion of said pin, a sheave surrounding and rotatably mounted on said bearing assembly, said sheave having an axially extending sleeve portion on each side thereof concentric with and radially spaced from both such pin and the outer peripheral surface of said sheave, an annular member on said pin on each side of said bearing assembly, each annular member having a peripheral portion adjacent the inside of one of said sleeve portions to provide a pair of opposed portions, a cap member mounted on said pin outside of and adjacent each of said annular members, each cap member having a portion surrounding and adjacent the outer portion of the last-mentioned one of said sleeve portions to provide a further pair of opposed portions, a sealing member between each of said pairs of opposed portions, means to support said pin and hold said cap member in sealing engagement with said pin and against rotation on said pin, said bearing assembly including a pair of antifriction bearing elements, said annular members being bearing retainer members screw-threaded on said pin and engaging said bearing elements, and a locking member engaging each annular member and mounted on said pin for preventing rotation of the annular members relative to said pin, said cap members holding said locking members in locking position.

References Cited in the file of this patent

UNITED STATES PATENTS

| | | |
|---|---|---|
| 538,011 | Crawford | Apr. 23, 1895 |
| 607,055 | Knape et al. | July 12, 1898 |
| 1,066,276 | Hockensmith | July 1, 1913 |
| 1,492,793 | Hansen | May 6, 1924 |
| 1,574,799 | Dierks | Mar. 2, 1926 |
| 1,807,038 | Holden | May 26, 1931 |
| 1,959,697 | Tracy | May 22, 1934 |